United States Patent [19]
Hamazaki et al.

[11] Patent Number: 5,240,729
[45] Date of Patent: Aug. 31, 1993

[54] CONTINUOUSLY HEAT-COOKING AND SHAPING METHOD FOR FOOD

[75] Inventors: Yasumitsu Hamazaki, Hiroshima; Motoharu Tachikawa, Kure; Kiyotaka Aoki, Hiroshima; Hideaki Hosaka, Fukuyama, all of Japan

[73] Assignee: Ahjikan Co., Ltd., Hiroshima, Japan

[21] Appl. No.: 813,396

[22] Filed: Dec. 27, 1991

[30] Foreign Application Priority Data

| Dec. 28, 1990 | [JP] | Japan | 2-402685[U] |
| May 9, 1991 | [JP] | Japan | 3-104215 |
| Aug. 30, 1991 | [JP] | Japan | 3-69569[U] |
| Aug. 30, 1991 | [JP] | Japan | 3-220475 |
| Aug. 30, 1991 | [JP] | Japan | 3-220476 |
| Aug. 30, 1991 | [JP] | Japan | 3-220477 |
| Aug. 30, 1991 | [JP] | Japan | 3-220478 |

[51] Int. Cl.$^5$ ............................................. A23L 1/00
[52] U.S. Cl. .......................... 426/438; 426/514; 426/523; 426/614
[58] Field of Search ............... 426/438, 439, 512, 514, 426/523, 614

[56] References Cited

U.S. PATENT DOCUMENTS 4,120,981 10/1978 Burkhart ............................ 426/438

FOREIGN PATENT DOCUMENTS

63-36758 2/1988 Japan .................................. 426/514

*Primary Examiner*—George Yeung
*Attorney, Agent, or Firm*—Nikaido, Marmelstein, Murray & Oram

[57] ABSTRACT

In a method and apparatus for continoulsy producing a heated roll-shaped food, a horizontal type of cylindrical or bell-shaped heating drum is rotated and heated while coated with a scorch-retarding oil film on the inner peripheral surface thereof and raw material is poured onto the inner peripheral surface thereof. The raw material is heated while spreading out on the inner peripheral surface of the heating drum with aid of fluidity of the raw material and the rotation of the drum. The heated raw material swells up along the inner peripheral surface of the heating drum, and is exfoliated from the inner peripheral surface due to its weight and reversed at a head edge portion thereof. Thereafter, the exfoliated and reversed tip edge portion of the gelled raw material is overlaid over a portion of the raw material which continuously swelling up to thereby form a core of the overlaid portions of the raw material and the continuously swelling raw material is rolled up around the overlaid portions serving as the core by means of its weight and an angular moment which is applied to the overlaid portions of the raw material due to the rotation of the heating drum. Finally, a roll-shaped product is taken out from a tip portion side of the heating drum. All of the above steps are continuously carried out.

4 Claims, 6 Drawing Sheets

CONTINUOUSLY HEAT-COOKING AND SHAPING METHOD FOR FOOD

BACKGROUND OF THE INVENTION

This invention relates to a method for continuously producing heated and roll-shaped food from raw material and an apparatus using the same.

In a conventional method of producing a heated and roll-shaped food such as an eggroll or a flavored eggroll, a raw material (stirred egg) is first fried in a sheet form on a pan or an iron plate, and then the sheet-shaped material is laminated or rolled into a desired shape. That is, the conventional method for producing the heated and shaped food utilizes a semi-continuous cooking process.

The applicant of this invention has proposed various apparatuses to approach the conventional process to a continuous one. Particularly, the applicant's attention is given to a method of producing a roll-shaped heated food using a horizontal-type frying drum. This method using the horizontal-type frying drum has the following construction.

The frying drum is rotatably mounted on a frame such that an inclination angle in its axial direction is freely adjustable, and a heater is also disposed so as to confront a lower portion of the outer peripheral surface of the frying drum. In addition, a scraper for scraping out the heated material is freely slidably disposed along the inner peripheral surface of the frying drum, and a take-up guide roller is disposed along a slightly higher position than an sliding edge portion of the scraper with respect to the inner peripheral surface of the frying drum and in such a manner as to be rotatable in the opposite direction to a rotational direction of the frying drum. Further, an oil coating roller is disposed so as to be in contact with the inner peripheral surface of the frying drum, and a material supply device is disposed at a position where materials are supplied or poured onto an upper portion of the inner peripheral surface of the frying drum.

The applicant has conducted various experiments using the above method, and has obtained the following recognitions.

At first, when a raw material having higher fluidity is poured onto the inner peripheral surface of the frying drum, the raw material is more extensively spread out (or thinly expanded) on the inner peripheral surface of the frying drum. Therefore, the rotational speed of the frying drum can be set to a relatively high speed. Inversely, when the raw material has lower fluidity, the spreading of the material is reduced. Therefore, in this case, the rotational speed of the frying drum is reduced to assure the spreading of the material. That is, the fluidity of the raw material and the rotational speed of the frying drum are dependent on each other.

Secondarily, unlike the fluidity of the raw material and the rotational speed of the drum, a frying temperature, that is, a heating temperature of the frying drum does not directly pertain to the spreading of the raw material. That is, the spreading of the raw material is not dependent on the heating temperature. However, the following recognition is obtained in a process where in a state where the raw material is spread out and then fried, that is, gelled on the inner peripheral surface of the drum, the material is partly exfoliated and reversed by the take-up guide roller and the scraper which are provided adjacently to the inner peripheral surface of the frying drum, and then the gelled material is rolled up in a roll shape with the exfoliated and reversed part of the gelled material being a core of the roll. That is, the following facts are found out.

If the heating temperature is sufficiently high, the raw material which has swelled up on the inner peripheral surface of the frying drum due to the gelation is in a semi-fried state where no fluidity is developed, and thus the gelled material is liable to be exfoliated. Therefore, when the gelled material which has swelled up along the inner peripheral surface, that is, along an arc surface of the frying drum is upwardly moved by the rotation of the drum to the position where its weight acts on itself, the gelled material is automatically exfoliated from the inner peripheral surface of the drum and then reversed at the tip portion thereof. That is, it is found that the scraper and the take-up guide roller are not necessarily required. Inversely, if the heating temperature is low, the exfoliation and reverse of the gelled material is insufficiently performed because of the insufficient gelation, so that it frequently occurs that the material is rolled up with distortion and unevenness. In other words, it is found that a shaped food which is homogeneous and symmetric is difficult to be obtained.

As described above, the tip edge portion of the material which has been exfoliated and reversed by its weight or the scraper and the take-up guide roller is overlaid over the front surface of the material. Since the gelation of the front surface of the material is relatively delayed, that is, is more insufficient in comparison with that of the back surface of the material, the tip edge portion of the material and the front surface portion of the material over which the tip edge portion is overlaid are integrated with each other because these portions is still in a semi-fried state, and thus have fluidity. During this overlaying process of the material, the drum continues to be rotated, and thus the integrated portions serve as a next core to roll up the raw material into a roll-shaped material. Once the core is formed, the gelled raw material which is successively swelling up is found to be continuously wound around the core because its weight and an angular moment act on the core insofar as the rotation of the drum is not stopped.

SUMMARY OF THE INVENTION

In view of the above recognitions, a continuously producing method for a heated roll-shaped food with raw material according to this invention, comprises a step of coating a scorch-retarding oil film on the inner peripheral surface of a horizontal type of cylindrical or bell-shaped heating drum while heating and rotating the heating drum, a step of continuously pouring raw material from a base end side of the heating drum onto the inner peripheral surface of the heating drum which has been coated with the oil film, and heating the raw material while spreading out the raw material on the inner peripheral surface of the heating drum with aid of fluidity of the raw material and the rotation of the drum, a step of allowing the heated gelled raw material to swell up along the inner peripheral surface of the heated drum, to be exfoliated from the inner peripheral surface due to its weight and reversed at the tip edge portion of the gelled raw material, a step of overlaying the exfoliated and reversed tip edge portion of the gelled raw material over a part of the raw material which is continuously swelling up to form a core of the overlaid portions of the raw material and winding the continuously swell-up raw material into a roll-shaped product around the overlaid portions serving as the core by means of its weight and an angular moment which is applied to the overlaid portions of the raw material due to the rotation of the heating drum, and a step of taking out a roll-shaped product from an outlet portion of the frying drum. These steps are continuously carried out and thus roll-shaped heated products are continuously produced.

According to the method of this invention, the heating drum is rotated in a inclinatory state, and then is heated by a heater which is disposed below a lower portion of the outer peripheral surface of the heating drum (or so as to confront the lower portion). At the time when the heating drum is heated to a predetermined temperature, a scorch-retarding oil is coated on the inner peripheral surface of the heating drum by an oil coating roller, and a take-up guide roller is rotated.

At the time when the above pre-works are completed, the raw material is supplied onto an upper portion of the inner peripheral surface of the heating drum at a higher position from a material supply device. The supplied material is heated and flows downwardly to a lower portion of the frying drum at a lower position because the heating drum is rotated in the inclinatory state, so that the material is subjected to a heating process while thinly spread out (or expanded).

Next, the heated material is naturally shaped in a roll form due to its weight or the heated material is scraped by the scraper which is disposed so as to be slidable in contact with the inner peripheral surface of the heating drum and rolled up by the guide roller into a roll-shaped product. The guide roller is disposed at a slightly higher position than the sliding edge portion of the scraper with respect to the inner peripheral surface of the heating drum in such a manner as to be rotated in the opposite direction to the rotational direction of the heating drum.

The roll-shaped heated material is taken out from an opening portion at the lower position of the drum my action of its weight in accordance with an inclination angle of the heating drum, that is, taken out as a roll-shaped heated product.

DETAILED DESCRIPTION OF THIS INVENTION

Preferred embodiments of this invention will be described with reference to the accompanying drawings.

Figure 1:
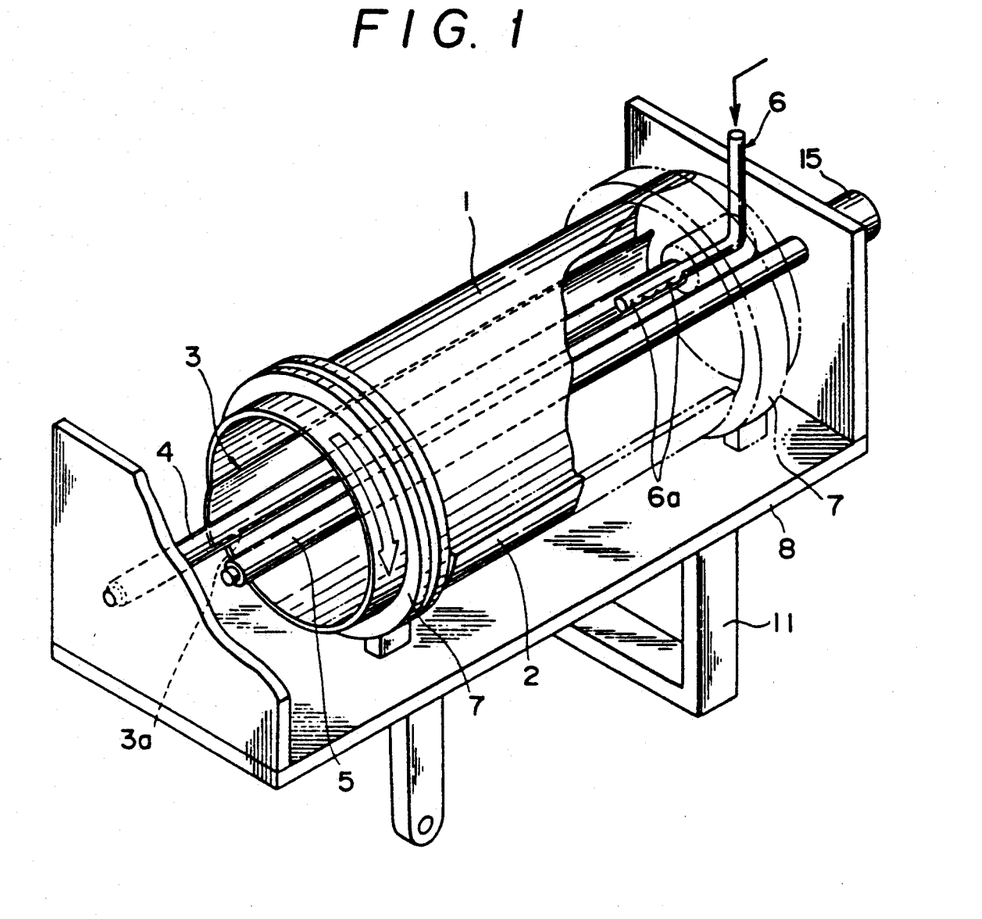
FIG. 1 is a perspective view of a main part of an apparatus to which the method of this invention is applied.
Figure 2:
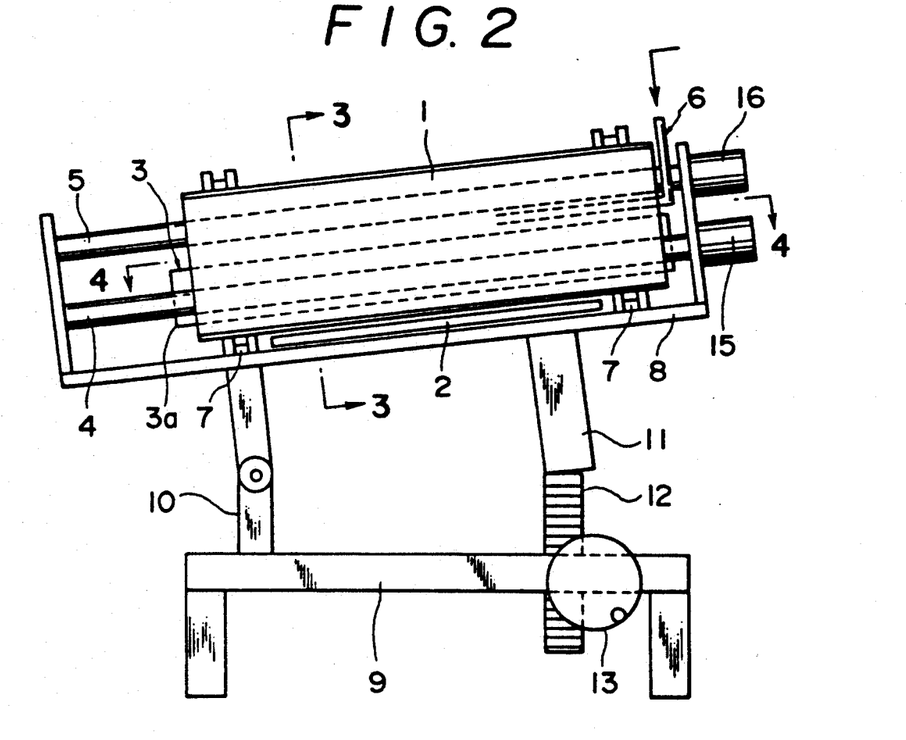
FIG. 2 is a side view of the apparatus as shown in FIG. 1.

As shown in FIGS. 1 and 2, a cylindrical frying drum 1 is freely rotatably supported at both of right and left end portions thereof through a bearing 7 on a drum frame 8, and also mounted on a frame such that an inclination angle of the frying drum 1 is freely adjustable.

In this embodiment, the following construction is adopted as means of adjusting the inclination angle. That is, as shown in FIG. 2, two support legs 10 and 11 are provided to the frying drum 1, and one support leg 10 at the left side of the frying drum 1 is so designed as to be freely bendy, while a screw shaft 12 is vertically disposed at the lower portion of the other support leg 11 at the right side of the drum 1. In addition, a handle 13 having a bevel gear (not shown) is engaged with the screw shaft 12, and the right side of the frying drum 1 is upwardly and downwardly moved by rotating the handle 13 to thereby adjust the inclination angle of the frying drum 1.

Figure 3:
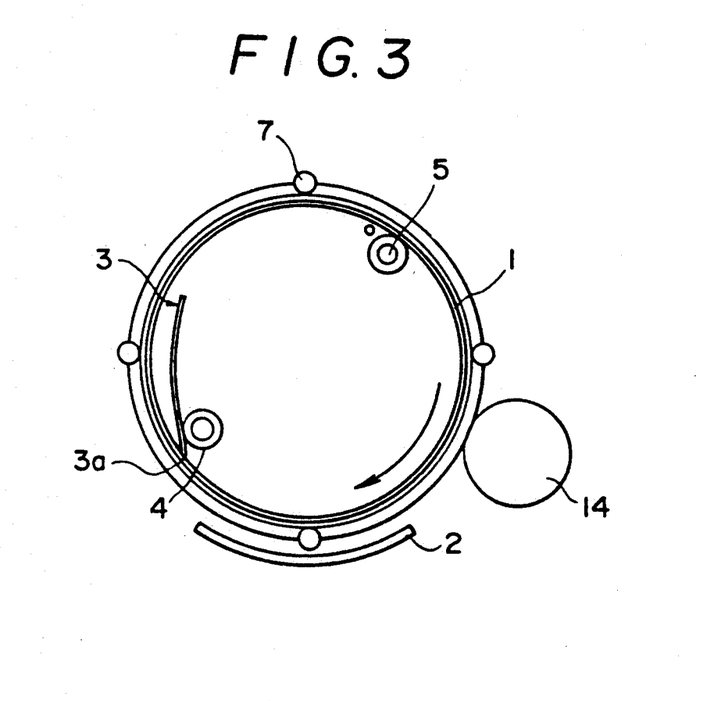
FIG. 3 is a longitudinal-sectional front view of the apparatus as shown in FIG. 2, which is taken along Y—Y line.

Further, as means of rotatably driving the frying drum 1 is adopted the following construction as shown in FIG. 3. That is, a driving motor 14 is disposed at the outer peripheral surface of the frying drum 1, and the driving motor 14 and the frying drum 1 are interlockingly linked with each other through a gear transmission mechanism (not shown), whereby the frying drum 1 is rotatably driven in synchronism with the rotation of the driving motor 14.

A face (surface) type heating body comprising an electric heater such as a seethe line is used as a heater 2, and is disposed so as to confront the lower surface of the outer peripheral surface of the frying drum 1 as shown in FIGS. 1 and 2.

As shown in FIG. 3, a scraper 3 is disposed in the frying drum 1 such that the lower edge portion 3a thereof is freely slidable along the inner peripheral surface of the frying drum 1, and a take-up guide roller 4 is also disposed along a slightly higher position than the sliding edge, that is, the lower edge portion 3a of the scraper 3 with respect to the inner peripheral surface of the frying drum 1 in such a manner that it is rotatably driven in the opposite direction to the rotational direction of the frying drum 1 as shown in FIG. 3. The take-up guide roller is rotated by a driving motor 15 in FIG. 2.

The scraper 3 and the take-up guide roller 4 are designed so as to be insertable into the frying drum 1 from the right side of the drum frame 8 as shown in FIGS. 1 and 2, and this inserting mechanism is utilized as means of detachably and individually installing the scraper 3 and the take-up guide roller 4 to the frying drum 1.

A scorch-retarding oil coating roller 5 is disposed so as to be rotatably driven in contact with the upper portion of the inner peripheral surface of the frying drum 1 as shown in FIGS. 1 and 3, and the driving motor 16 is also used as rotating means for the oil coating roller 5a as shown in FIG. 2, like the take-up guide roller 4.

A material supply device 6 is so designed that a raw material is poured from a material stirring and mixing device (not shown) through supply nozzles 6 and 6a disposed at the upper and right side of the inner peripheral surface of the frying drum 1 as shown in FIG. 1 by a supply pump. In this embodiment, the supply nozzle 6a is provided with plural supply openings so that the material is homogeneously supplied to the inside of the frying drum 1 and a supply mount of the material can be controlled.

Figure 4:
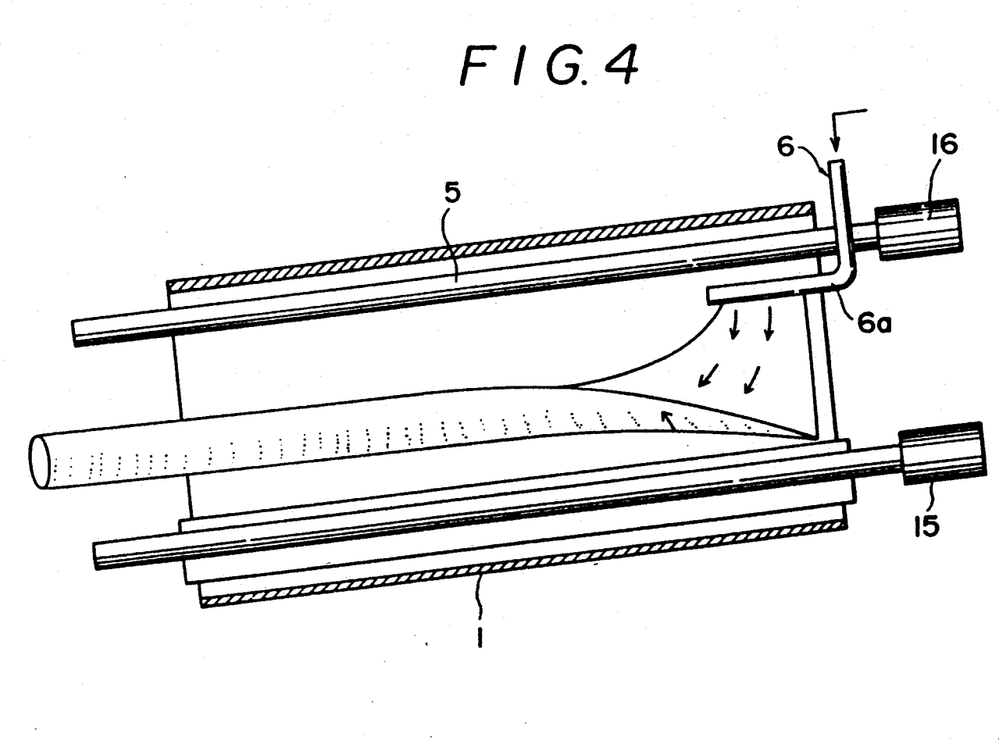
FIG. 4 is a cross-sectional view of the apparatus as shown in FIG. 2, which is taken along X—X line, and showing the state of a heated and shaped material within a frying drum.

As described above, the frying drum 1 is beforehand heated by the heater 2, concretely to 170° C. or more, and the scorch-retarding oil is coated on the inner peripheral surface of the frying drum 1 by the oil coating roller 5, so that the supplied material flows from the higher position to the lower position along the inner peripheral surface of the inclined frying drum 1 (from the right side to the left side as shown in FIG. 4). In addition, since the frying drum 1 is rotated, the material is thinly spread out (expanded) in association with the rotation of the frying drum 1 and heated while flowing along the inner peripheral surface of the frying drum 1.

Since the frying drum 1 is inclined, the fried material is gradually moved from the right side to the left side in FIG. 4, and rolled up due to its weight, or scraped off by the scraper 3 and reversed by the take-up guide roller 4 to be rolled up. The rolled material is fed out from the left end of the frying drum 1. Insofar as the material is continuously supplied, a roll-shaped fried product such as a flavored eggroll can be continuously produced.

Figure 5:
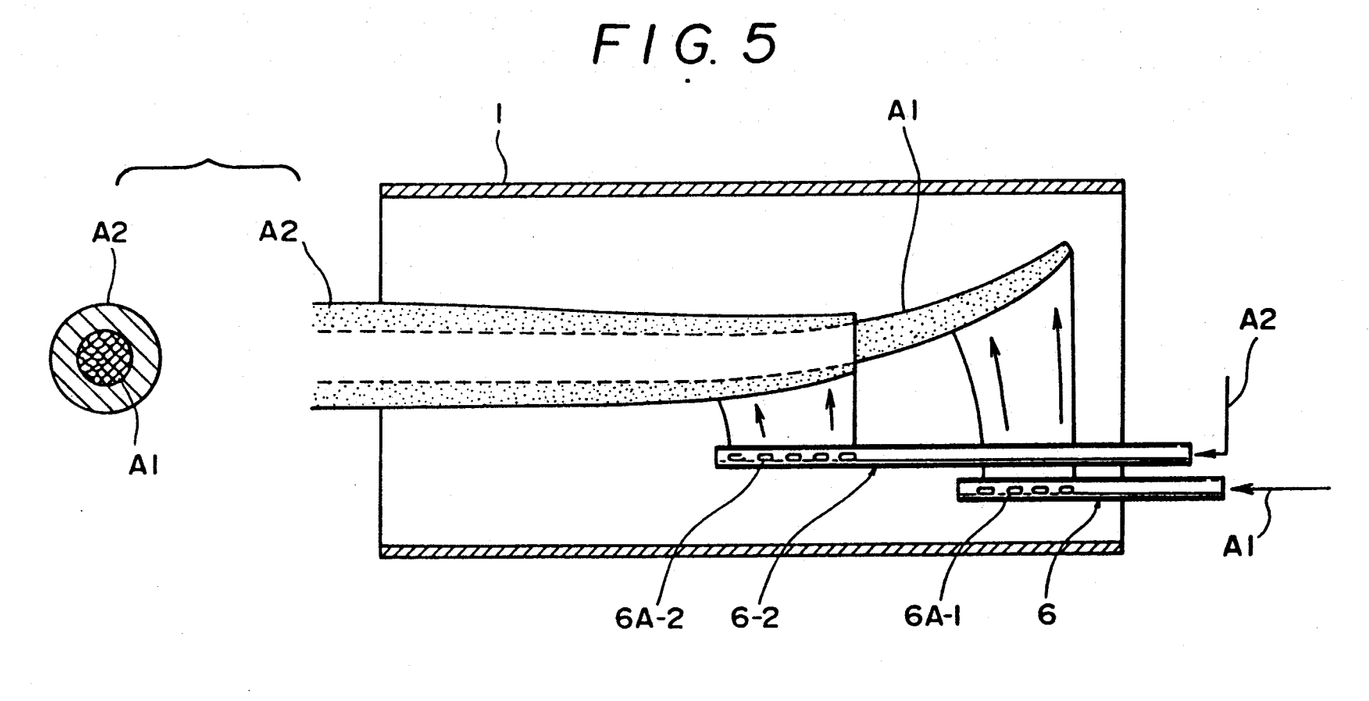
FIG. 5 is an explanatory diagram for a method in which plural material supply ports for the frying drum of this invention are provided.

FIG. 5 shows a second embodiment of this invention. As shown in FIG. 5, two material supply devices each having a nozzle group of supply ports 6A at the tip portion thereof, and first and second raw materials A and A2 are poured onto the inner peripheral surface of the frying drum 1 from a supply port 6A-1 of the first material supply device 6-1 and a supply port 6A-2 of the second material supply device 6-2. Each of the material supply devices 6-1 and 6-2 has a stirring and mixing device and a supply device (not shown) and these devices 6-1 and 6-2 may be disposed in parallel with each other in an up-and-down or right-and-left direction in such a manner that the supply port 6A-1 and the supply port 6A-2 are located at inlet and outlet sides of the frying drum 1, respectively, away from each other at a predetermined interval.

In an experiment using the apparatus thus constructed, a long eggroll could be continuously obtained under the following conditions: the inclination angle of the frying drum 1 is set to 10° (the frying drum 1 is inclined downwardly toward the take-out side of the material); the number of revolutions of the frying drum 1 is set to 2 rpm; the distance between the supply ports 6A-1 and 6A-2 is set to 20 cm; and the supply amounts of the first raw material A1 (yolk of 60 wt %, white of egg of 15 wt %, flavoring of 25 wt %) and the second raw material A2 (yolk of 80 wt %, starch of 3 wt %, flavoring of 17 wt %) are poured through the supply ports 6A-1 and 6A-2, respectively.

As described above, according to the continuous heat-cooking and shaping apparatus, the following effects can be more sufficiently obtained in comparison with the conventional heat-cooking and shaping apparatus.

(1) Since heating and shaping processes, that is, frying and shaping processes are performed by a series of continuous processes, the productivity of the apparatus of this invention is more remarkably improved in comparison with the conventional apparatus in which the heating (frying) and shaping processes are separately and discontinuously carried out, and in addition the shaping process is manually carried out. Particularly, in this invention the heating and shaping processes are continuously carried out in the same frying drum, so that the quality of a product, that is, the fry-up quality of the product can be uniformalized, and thus heated and shaped foods having uniform quality can be supplied to the market.

(2) The apparatus according to this invention is so designed that the frying drum serves as a main body, and the scraper, the take-up guide roller and the oil coating roller are disposed within the frying drum, thereby miniaturizing the whole construction of the apparatus. Therefore, the productivity per an effective mount area of the apparatus can be remarkably improved in cooperation with the effect (1).

Since the material is fried particularly while thinly spread out (expanded) in the frying drum, the productivity is also remarkably high. For example, when a flavored eggroll of uniform thickness is fried using a conventional apparatus, the fried eggroll finally has a thickness of 3 mm at minimum (this is also dependent on the viscosity of the material). However, according to the apparatus of this invention, the frying drum is rotated and the inclination angle of the frying drum is freely adjustable, so that a fried eggroll having a thinner thickness can be produced by adjusting the rotational speed of the frying drum and the inclination angle to suitable ones. For example, a product having a thickness of 1 mm or less can be produced using the apparatus of this invention. Accordingly, in comparison with the conventional apparatus, the frying capability, that is, productivity per frying area is redoubled in the apparatus of this invention.

(3) As described above, the inclination angle of the frying drum is freely adjustable, and thus the inclination angle may be changed in accordance with the fluidity of the material. As a result, an application to a heated and shaped product, particularly to a roll-up product can be broadened. Further, the diameter of the take-up guide roller is selectively set to a suitable one, and the rotational speed and the inclination angle of the frying drum are selectively set to suitable ones, whereby a size of the product is freely changeable to satisfy client's needs in the market. For example, the supply amount of the raw material into the frying drum is varied every constant period to thereby change the thickness of a roll-shaped product.

Figure 6:
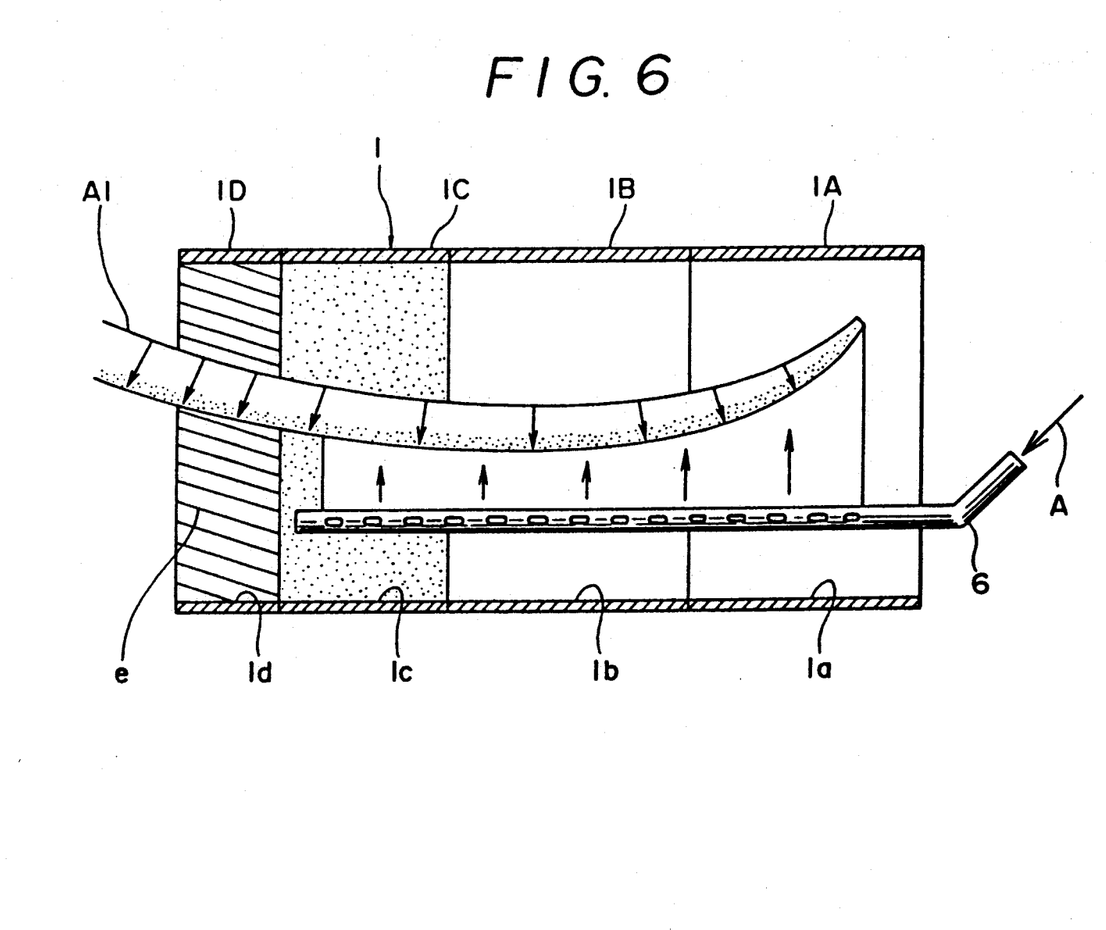
FIG. 6 is an explanatory diagram for the frying drum which is sectioned into plural parts in an axial direction thereof.

The rotary drum is used in consideration of the following fact that in association with the rotation of the drum, the material which has not completely solidified is rolled up by its weight and its diameter is gradually increased. As a third embodiment, as shown in FIG. 6, a surface processing treatment or material of the inner peripheral surface of the frying drum may be changed to vary the friction coefficient thereof, whereby a position at which the roll-up of the material is started can be controlled. Accordingly, the friction coefficient of the inner peripheral surface of the frying drum is set to be gradually larger toward the outlet side of the frying drum, whereby the roll-up action of the material at the outlet side is started (or allowed to equilibrate) at a higher position. In this state, the roll-shaped material rotating in the frying drum is about to be rolled toward the outlet side (in the moving direction), and thus a component of force applied to the roll-shaped product in the axial direction of the drum is strengthened. By utilizing this phenomenon, the product can be continuously taken out of the frying drum without inclining the frying drum, and the product can be stably produced without slip of the product along the inner peripheral surface of the frying drum.

The take-out speed of the product and the thickness of the product can be adjusted by changing gradient of the friction coefficient of the inner peripheral surface of the frying drum from the inlet side to the outlet side of the frying drum. Otherwise, the inclination of the drum and the adjustment of the friction coefficient may be utilized in combination. In this case, there occurs a case where the inlet side is disposed at a lower position. At any rate, the adjustment of the take-out speed and the thickness of the product can be adjusted.

In FIG. 6, the frying drum 1 is sectioned into cylindrical four parts 1A, 1B, 1C and 1D in the axial direction of the drum, and each of the sectioned cylindrical four parts is subjected to the following surface treatment and processing or is formed of a different material, whereby the friction coefficients of the inner peripheral surfaces 1a, 1b, 1c and 1d of the frying drum are stepwisely or successively increased from the inlet side of the drum to the outlet side of the drum.

The inner peripheral surface 1a (first sectioned surface 1a) of the first sectioned part 1A is subjected to a coating process of fluorine contained resin (Teflon), the inner peripheral surface 1b (second sectioned surface 1b) of the second sectioned part 1B is formed of iron which is subjected to a honing-polishing treatment, the inner peripheral surface 1c (third sectioned surface 1c) of the third sectioned part 1C is formed of iron which is subjected to a sand blast treatment, and the inner peripheral surface 1d (fourth sectioned surface 1d) of the fourth sectioned part 1D is formed of silicone sponge which has projections e spaced at an interval of 1 cm.

Here, the third and fourth sectioned surfaces 1c and 1d are designed so as to be shorter in the axial direction of the drum than the second and third sectioned surfaces 1b and 1c, and the projections e of the silicone sponge comprise linear projections which are inclined in the rotational direction of the drum at the outlet side of the drum. In addition, the nozzle portion of the material supply device 6 is so designed as to extend to the third sectioned surface 1c, and the raw material is fried in a sheet form at the first to third sectioned surfaces 1a to 1c while the fried material is shaped into a roll form and taken out at the fourth sectioned surface 1d.

As an experiment, the frying drum 1 thus constructed was substantially horizontally disposed, and a raw material was fried while rotated at the number of revolutions of 20 rpm. As a result, a roll-shaped product having constant thickness could be stably obtained.

Figure 7:
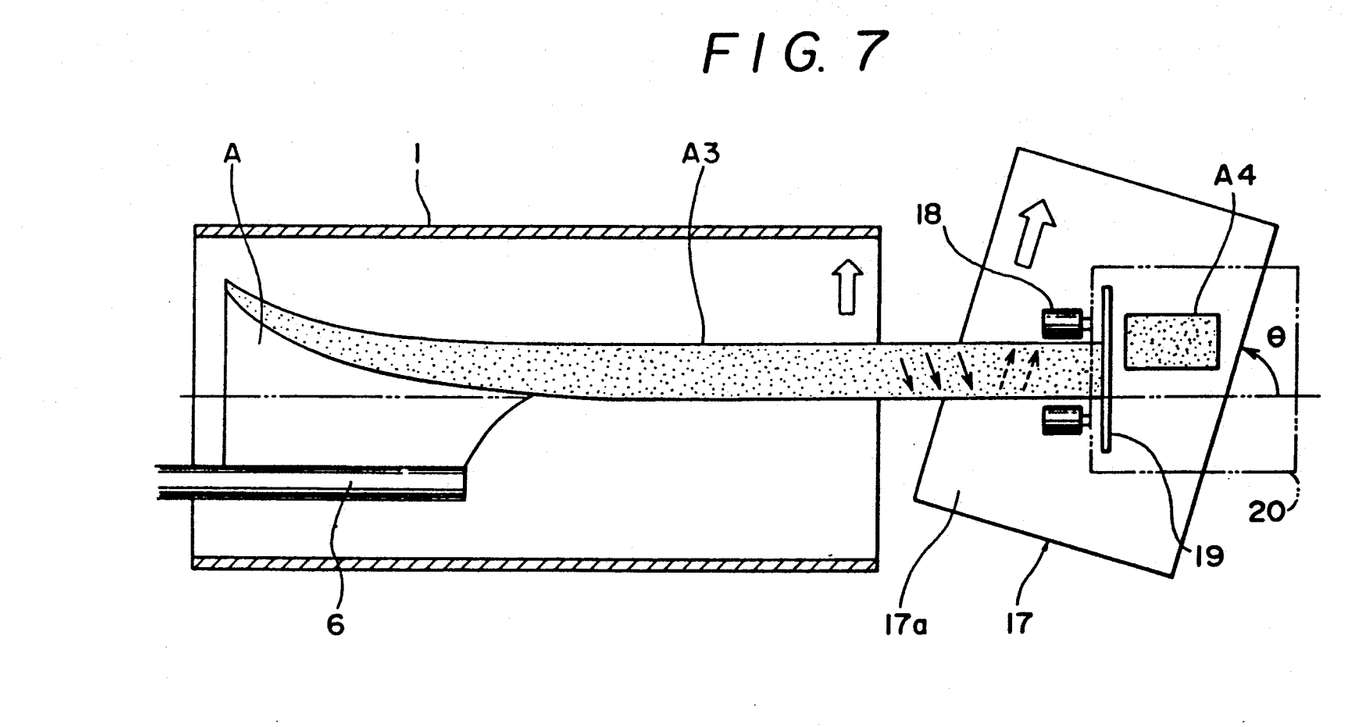
FIG. 7 is an explanatory diagram for showing an embodiment of a take-out device for a roll-shaped heated (cooled) food according to this invention.

As a take-out device of the heated product (food) is adopted the following construction. That is, as shown in FIG. 7, a belt conveyer 17 is disposed at the outlet side of the frying drum 1, and a guide 18 and a cutter 19 are disposed above the belt conveyer 17. This take-out device is also used to take out from a horizontal type rotating drum a roll-shaped heated food such as a flavored eggroll which is continuously produced in the horizontal type rotating drum or a roll-shaped cooled food such as an agar roll, and is disposed at the outlet side of the horizontal type rotating drum so as to be inclined to a moving direction of the roll-shaped heated or cooled food. The take-out device comprises a carry conveyer such as a belt conveyer for supporting the roll-shaped heated or cooled food thereon, a guide for retarding the movement of the roll-shaped heated or cooled food on the carry conveyer in a traveling direction of the conveyer, and a cutter disposed above the carry conveyer for cutting the roll-shaped heated or cooled food at a constant period.

In FIG. 7, the belt conveyor 17 is inclined at an angle $\theta$ to the center axis of the frying drum 1, that is, the moving direction of a roll-shaped product A3, and the take-out device is disposed at such a position that the roll-shaped product A3 fed out of the frying drum 1 is supported at the substantially center portion of a carry plane 17a of the carry conveyer 17 in the traveling direction. The inclination angle $\theta$ and the traveling speed of the belt conveyer are set in accordance with the peripheral speed of the frying drum 1 and the moving speed of the roll-shaped product A3.

The guide 18 serves to retard the movement of the roll-shaped product A3 on the belt conveyer 17 in the traveling direction of the conveyer, and to restrict the moving direction of the product A3, and comprises a pair of driven guide rollers 18 which are spaced at an interval longer than the diameter of the product A3 and rotated by the contact with the roll-shaped product A3. Further, each of the guide rollers 18 is pivotably cantilevered at the edge surface of a support frame 20 which is disposed above the belt conveyer 17.

The cutter 19 comprises a reciprocating type of shearing blade which is vertically reciprocated at a constant period, and disposed behind the guide 18. A rotatably-driving mechanism and a vertically-driving mechanism (not shown) for the cutter 19 are also mounted on the support frame 20. The cutter 19 is not limited to the reciprocating type of shearing blade, but may be a reciprocating or swing type of rotatable blade.

For example, in a case where the diameter of the frying drum 1 is set to 30 cm; the number of revolutions of the drum, 5 rmp (peripheral speed of the drum: 471 cm/minute); and the inclination angle, 10°, the roll-shaped product A3 is taken out from the frying drum at a take-out speed of 80 cm/minute while rotated. In the apparatus thus constructed, when the inclination angle $\theta$ of the belt conveyer is set to 80°, the speed of the belt conveyer is set to 480 cm/minute and the frying drum 1 and the belt conveyer 17 are interlockingly moved with each other, products A4 which are cut off from the roll-shaped product A3 at a constant length can be continuously obtained.

In the above embodiments, the term "fry" is mainly used because the apparatus of this invention is representatively applied to a case where a food such as an eggroll to be fried is produced as a product. However, the product is not limited to the food such as eggroll to be fried, but may be a food to be baked, burned, steamed or the like. In these cases, the term "fry" used in the above description should be changed to "bake", "burn", "steam" or the like.

What is claimed is:

1. A method for continuously heat-cooking and shaping a raw fluid material to produce a heated roll-shaped food comprising the steps of:
   rotating a horizontal type of cylindrical or bell-shaped heating drum while heating the drum and coating a scorch-retarding oil film on the inner peripheral surface of the heating drum;
   continuously pouring raw fluid material onto the inner peripheral surface of the heating drum which has been coated with the oil film and heating the raw material while spreading out the raw material on the inner peripheral surface of the heating drum with aid of fluidity of the raw material and the rotation of the drum;

allowing the heated raw fluid material to gell and to swell up along the inner peripheral surface of the heated drum, wherein the raw material is exfoliated from the inner peripheral surface of the drum due to its weight and is reversed at a tip edge portion thereof;

laying the exfoliated and reversed tip edge portion of the gelled raw material over a portion of the raw material which continuously swells up to thereby form a core of the overlaid portions of the raw material and allowing the continuously swollen-up raw material to roll up around the overlaid portions serving as the core by means of its weight and an angular moment which is applied to the overlaid portions of the raw material due to the rotation of the heating drum; and taking out a roll-shaped product from an outlet portion of the heating drum, wherein all of said steps are continuously carried out.

2. The method as claimed in claim 1, wherein said horizontal type of heating drum is downwardly inclined at a angle from a base portion thereof to a tip portion thereof, and the inclination angle, the rotational speed and the heating temperature of the heating drum are adjusted to suitable ones in accordance with the fluidity of the raw fluid material, the drum being rotated under the suitably-adjusted inclination angle, rotational speed and heating temperature.

3. The method as claimed in claim 1, wherein said horizontal type of heating drum is provided with plural supply ports through which different kinds of food materials are poured.

4. A method for continuously producing an omelet-like heated food using the method as claimed in claim 1, further comprising a step of changing a supply amount of the raw fluid material to the horizontal type of heating drum at a constant period to vary the thickness of the roll-shaped product in the heating drum.

* * * * *